US012467284B2

(12) United States Patent
Moloney

(10) Patent No.: US 12,467,284 B2
(45) Date of Patent: Nov. 11, 2025

(54) LATCH MECHANISM

(71) Applicant: Thomas Moloney Pty Limited, Somersby (AU)

(72) Inventor: Thomas Moloney, Wamberal (AU)

(73) Assignee: Thomas Moloney Pty Limited (AU)

( * ) Notice: Subject to any disclaimer, the term of this patent is extended or adjusted under 35 U.S.C. 154(b) by 0 days.

(21) Appl. No.: 17/477,946

(22) Filed: Sep. 17, 2021

(65) Prior Publication Data

US 2022/0090414 A1 Mar. 24, 2022

(51) Int. Cl.
*E05B 65/46* (2017.01)
*E05B 83/28* (2014.01)
*E05C 1/08* (2006.01)

(52) U.S. Cl.
CPC .............. *E05B 65/46* (2013.01); *E05B 83/28* (2013.01); *E05C 1/08* (2013.01)

(58) Field of Classification Search
CPC .......... E05B 65/44; E05B 65/46; E05B 53/00; E05B 63/0069; E05B 83/28; E05B 2001/0076; E05C 1/08; E05C 1/004; E05C 1/12; E05C 19/007; A47B 88/50
See application file for complete search history.

(56) References Cited

U.S. PATENT DOCUMENTS 1,965,939 A * 7/1934 Jacobi ..................... E05B 83/30 70/DIG. 4
5,802,892 A * 9/1998 Cohn .................... E05B 65/462 70/84
5,862,892 A * 1/1999 Conley ................. F16D 65/123 188/218 XL
8,979,140 B2 * 3/2015 Tien .......................... E05C 7/06 292/DIG. 21
10,443,271 B1 * 10/2019 Rose ....................... E05B 65/46
10,704,297 B2 * 7/2020 Liang ........................ E05C 1/12
10,794,094 B2 * 10/2020 Hegde ....................... B60R 7/06
11,643,845 B2 * 5/2023 Uyeda ................... E05B 47/026 70/278.1
2005/0268432 A1 * 12/2005 Migli .................... E05C 19/165 16/258
2013/0062892 A1 * 3/2013 Chow ....................... E05C 1/16 292/175
2015/0156182 A1 * 6/2015 Nakano ................. H04L 9/3273 713/171
2015/0225985 A1 * 8/2015 Guidos ............... E05B 65/0876 292/336.3
2021/0156182 A1 * 5/2021 Rickenbaugh .......... E05C 9/041

* cited by examiner

*Primary Examiner* — Kristina R Fulton
*Assistant Examiner* — Thomas L Neubauer
(74) *Attorney, Agent, or Firm* — McHale & Slavin, P.A.

(57) ABSTRACT

Disclosed is a to a latch mechanism that is operatively connected to a handle assembly or similar release device for a drawer, cabinet or other similar item. The latch mechanism is particularly useful for a drawer in a vehicle, where it may be subject to movement or situations where it is not level. The latch mechanism includes a keeper and a pin that is fitted to a bracket allowing sliding movement of the pin. The pin is biased towards an extended position and may selectively be located within the keeper when in the extended position so as to latch the bracket to the keeper. The pin is selectively engaged by an actuator so that the actuator may move the pin from the extended position to a retracted position, but the pin is also able to move from the extended position to the retracted position without effecting the actuator.

14 Claims, 5 Drawing Sheets

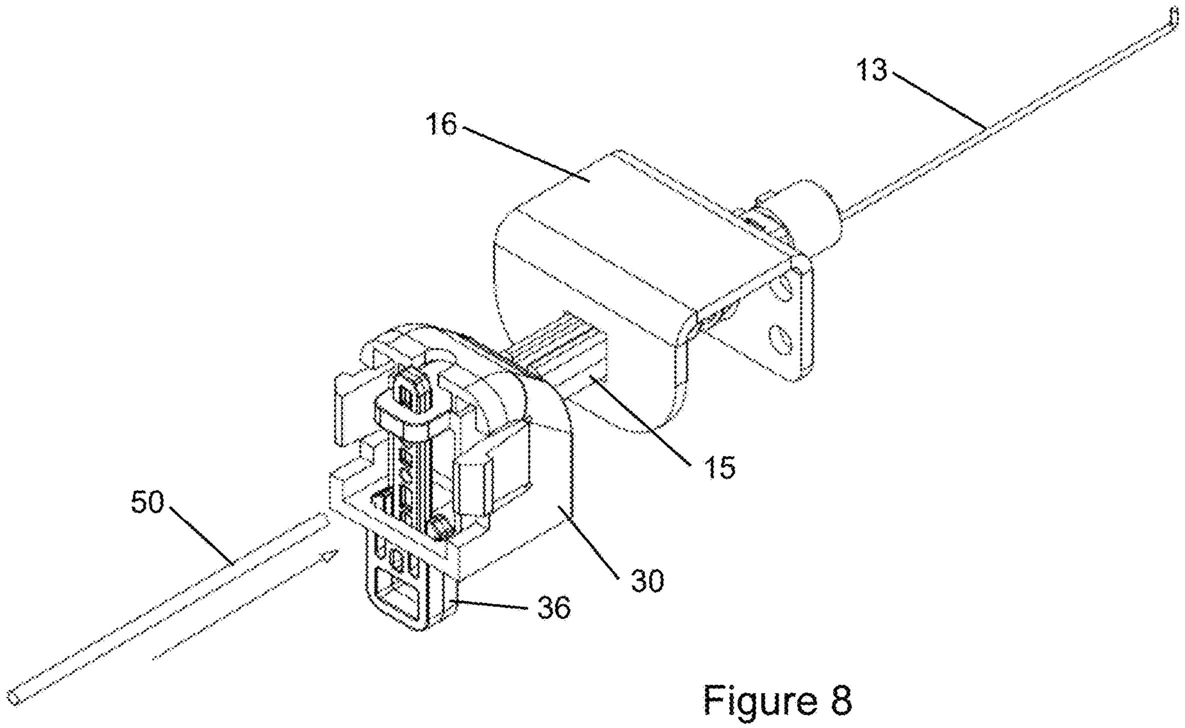
Figure 8
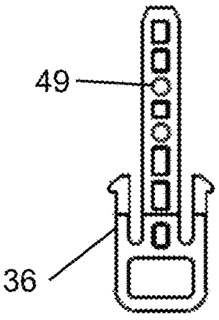
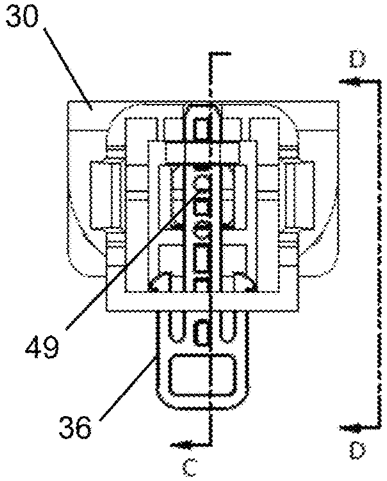
Figure 9
Figure 10

LATCH MECHANISM

PRIOR APPLICATION

In accordance with 37 C.F.R. 1.76, a claim of priority is included in an Application Data Sheet filed concurrently herewith. Accordingly, the present application claims priority from Australian Provisional Application No. 2020903349 titled "Latch Mechanism" as filed on 18 Sep. 2020, the content of which is hereby incorporated by reference in its entirety.

TECHNICAL FIELD

The present invention generally relates to a latch and release mechanism that is operatively connected to a handle assembly or similar release device for a drawer, cabinet or other similar item.

BACKGROUND

Drawers with devices for releasably locking the drawer in a closed position are known for use in various applications. For example, a lock barrel may be provided whereby when locked the drawer is prevented from opening, or a key is inserted and turned to release the drawer so that it is free to be opened. Other examples may have a latch that prevents the drawer from falling open, but wherein the retention of the latch can be overcome and the drawer opened simply by providing sufficient force to open the drawer.

It may be desirable, however, to allow the drawer to be secured in a closed position, but released and opened using a handle assembly or some other release device. Such a configuration may allow for the drawer to be locked in the closed position, or at least prevented from any chance of accidental opening.

Similar issues as described above also apply to other items, such as cabinets or cupboards, for example. The present invention seeks to provide a latch mechanism that can be connected to a handle assembly or other release device, so that the latch mechanism can be used with a drawer or other item to address the above and/or other problems or drawbacks of the prior art.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

In one broad form of the invention, there is provided a latch mechanism, comprising: (a) a keeper comprising an aperture and being configured to be mounted to a supporting structure; and (b) a pin that is fitted to a bracket in a manner that allows sliding movement of the pin along a longitudinal axis of the pin relative to the bracket, thereby allowing movement of the pin between an extended position and a retracted position, wherein the pin is biased towards the extended position; wherein the pin may selectively be located within the aperture when in the extended position so as to latch the bracket to the keeper, this latch being released and the bracket being able to move relative to the keeper when the pin is moved to the retracted position, and wherein the pin is selectively engaged by an actuator so that the actuator may move the pin from the extended position to the retracted position, but the pin is able to move from the extended position to the retracted position without effecting the actuator.

In one example form, the keeper and the pin have corresponding bevels, so that when the bevel of the pin contacts the bevel of the keeper the pin is forced from the extended position towards the retracted position.

In another example form, the actuator engages the pin using a rod and by applying tension to the rod. Preferably, the rod is rigid.

In one example form, the rod is fitted to the pin in a manner that allows sliding movement of the rod relative to the pin along the longitudinal axis of the pin.

In another particular, but non-limiting, example form, the rod has a latch or bend at an end that is fitted to the pin, the latch or bend abutting a shoulder of the pin so as to limit the extent of the relative sliding movement of the rod.

In one example form, the pin comprises a channel extending away from the shoulder such that the latch or bend of the rod is able to move away from the shoulder.

In one example form, the rod is located in a slot of the pin and a clamp retains the rod in the slot.

In one example form, a length of the rod can be changed to allow the latch mechanism to be fitted in situations where the distance between the actuator and the pin varies.

In one example form, the bracket comprises two flanges that each comprise an aperture, the pin being fitted through the apertures in the flanges, and a spring surrounds the pin between the flanges.

In one example form, at least one of the flange apertures comprises a key and the pin comprises a keyway, such that the key slides within the keyway while preventing rotation of the pin.

In one example form, a retaining pin is fitted to the pin at a location between the flanges, such that the retaining pin limits the travel of the pin and the spring abuts the retaining pin and one of the flanges of the bracket.

In one example form, at least one of the flange apertures comprise a sleeve insert.

In one example form, the keeper has a protrusion extending through the mounting structure, and a keeper retaining pin extends through an aperture in the protrusion thereby securing the keeper to the mounting structure.

In one example form, the keeper comprises one or more through holes and the keeper retaining pin comprises a through hole, the through holes of the retaining pin and the keeper being aligned to allow access by a release device to the pin when located in the aperture.

According to another broad form, there is provided a drawer unit, comprising a latch mechanism according to any one of the preceding claims.

In one form, the drawer unit comprises a drawer mounted in a housing, wherein the pin mount is secured to the drawer and the housing forms the supporting structure to which the keeper is mounted.

In one example form, the keeper comprises a dampener that is positioned such that the drawer contacts the dampener when in a closed position and/or close to the closed position, but wherein the pin does not contact the dampener during closing of the drawer.

In one example form, a series of aligned holes allow access to the pin when located in the aperture from outside the drawer unit by a release device.

In one example form, the drawer unit is mounted in a vehicle, such as a van, ute, truck, caravan, or boat.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF FIGURES

Example embodiments should become apparent from the following description, which is given by way of example only, of at least one preferred but non-limiting embodiment, described in connection with the accompanying figures, wherein:

FIG. 8 illustrates a lower isometric view of the latch mechanism and a release device;

FIG. 9 illustrates an end view of the keeper retaining pin;

FIG. 10 illustrates an end view of the latch mechanism showing the locations of sections C-C and D-D;

DETAILED DESCRIPTION

Figure 1:
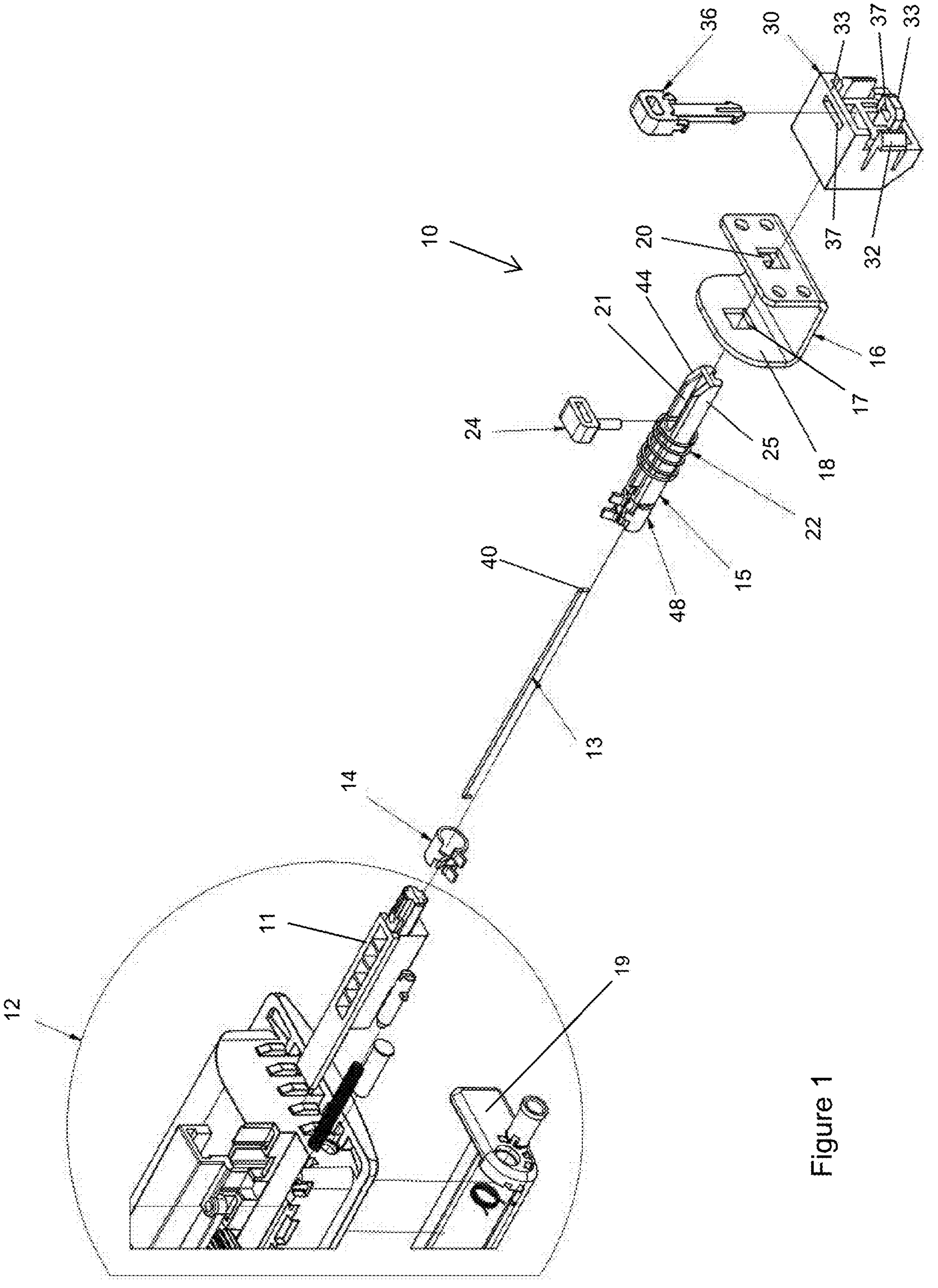
FIG. 1 illustrates an exploded isometric view of a latch mechanism according to an embodiment of the invention.

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

Referring to FIG. 1, a latch mechanism 10 according to an embodiment of the invention is shown. The latch mechanism 10 is connected to an actuator 11 of a handle assembly 12 by a rod 13. The rod 13 is secured to the actuator using a clamp 14.

The opposite end of the rod 13 is connected to a pin 15 of the latch mechanism 10. The pin 15 is fitted to a bracket 16 by being inserted through apertures 17 in flanges 18 of the bracket 16. The pin 15 is able to slide within the apertures 17 along a longitudinal axis of the pin 15. One of the apertures 17 has a key 20 and the pin 15 has a keyway 21, so that the key 20 slides within the keyway 21 while preventing rotation of the pin 15.

Figure 14:
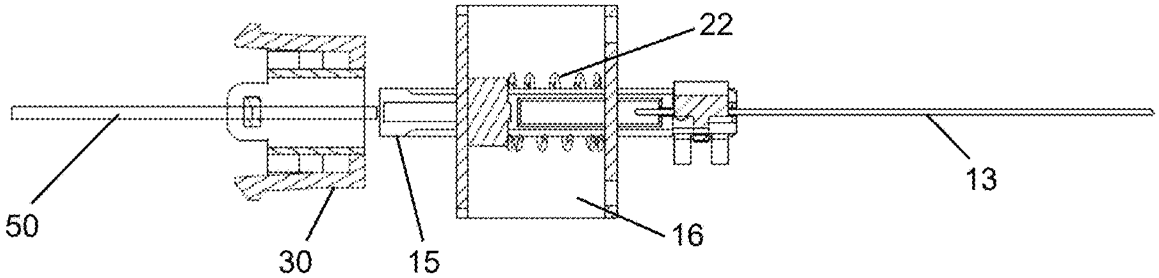
FIG. 14 illustrates a cross sectional bottom view of the latch mechanism taken along section E-E.

In an alternative embodiment, a sleeve insert 54 (FIG. 14) may be positioned within one or both of the apertures, so that the pin 15 slides within the sleeve insert 54. This sleeve insert 54 may be made from plastic, and/or may include a lubricant to allow the pin 15 to slide more easily. Without such a sleeve, it is possible that the bracket 16, which may only be about 1.9 mm thick in some examples, could create an indent in the pin 15 if under load, preventing the pin 15 from sliding easily within the bracket 16. Such a load may be common if the mechanism 10 is used in a drawer in a vehicle, for example, here the vehicle could be parked on ground that is not level. The sleeve insert 54 can increase the contact area with the pin 15, thereby reducing the likelihood of the pin 15 becoming stuck in such a situation.

Figure 7:
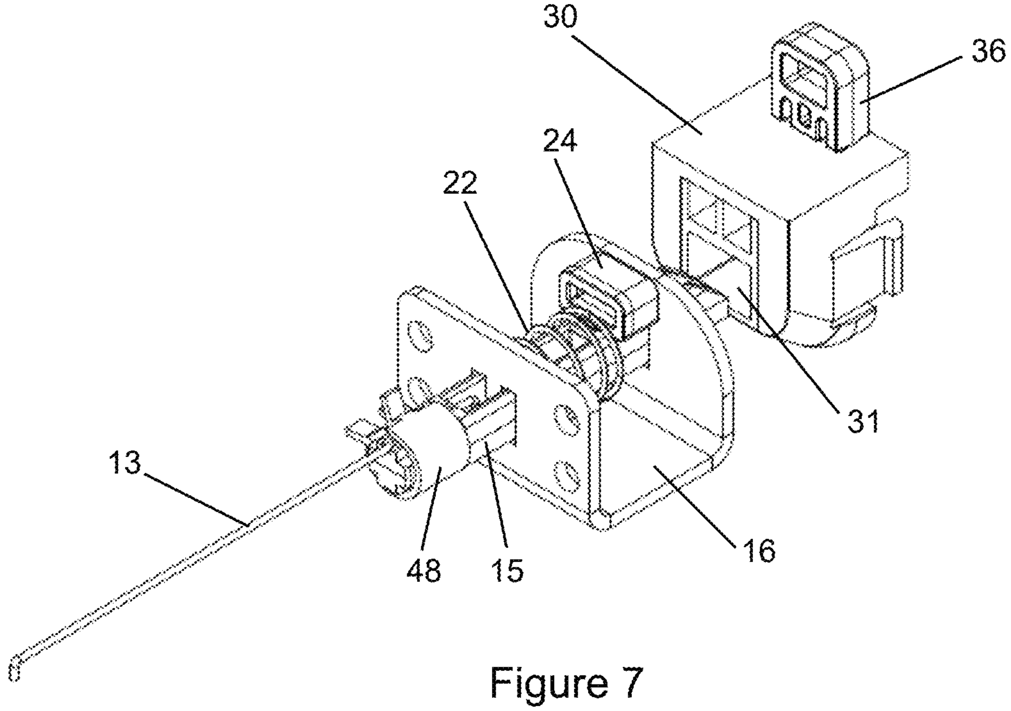
FIG. 7 illustrates an upper isometric view of the latch mechanism.

In the embodiment of FIG. 1, a spring 22 surrounds the pin 15 at a location between the flanges 18 of the bracket 16. There is also a retaining pin 24 fitted to the pin 15 at a location between the flanges 18, so that the retaining pin 24 limits the travel of the pin 15. Additionally, the spring 22 abuts the retaining pin 24 and one of the flanges 18 of the bracket 15, thereby biasing the location of the pin 15 relative to the bracket 16. FIG. 7 also shows this setup in some detail.

Figure 2:
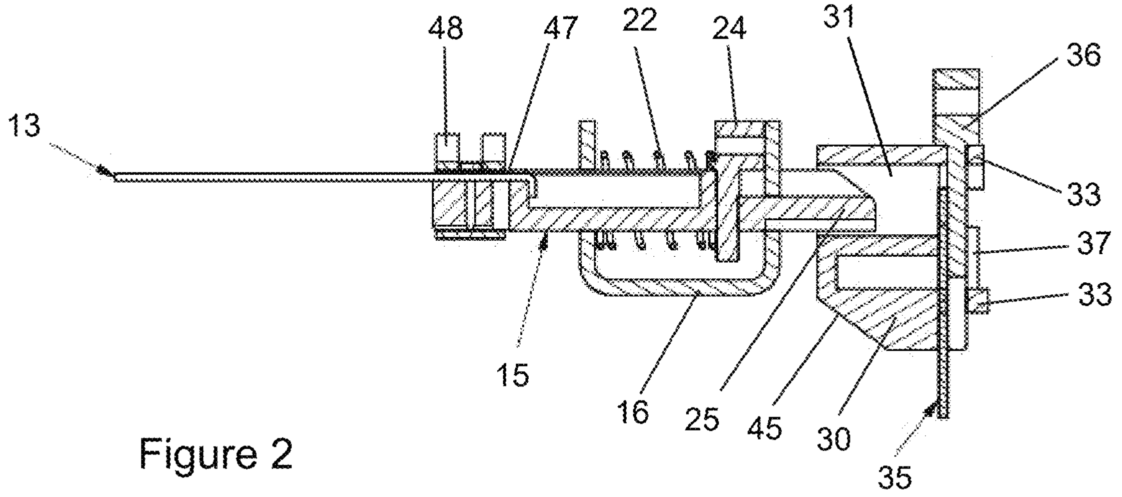
FIG. 2 illustrates a cross sectional side view of the latch mechanism from FIG. 1, with a pin in an extended position and in a latched configuration with a keeper.
Figure 3:
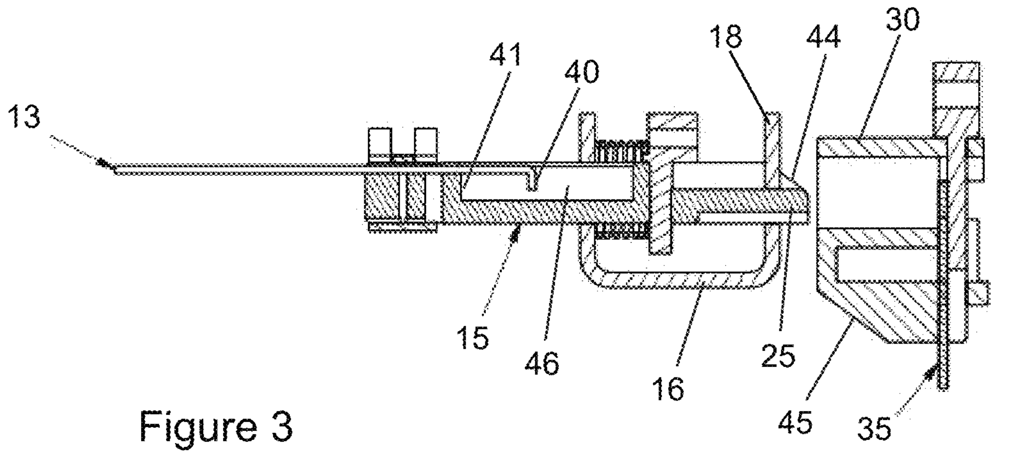
FIG. 3 illustrates a cross sectional side view of the latch mechanism from FIG. 1, with the pin in a retracted position.
Figure 4:
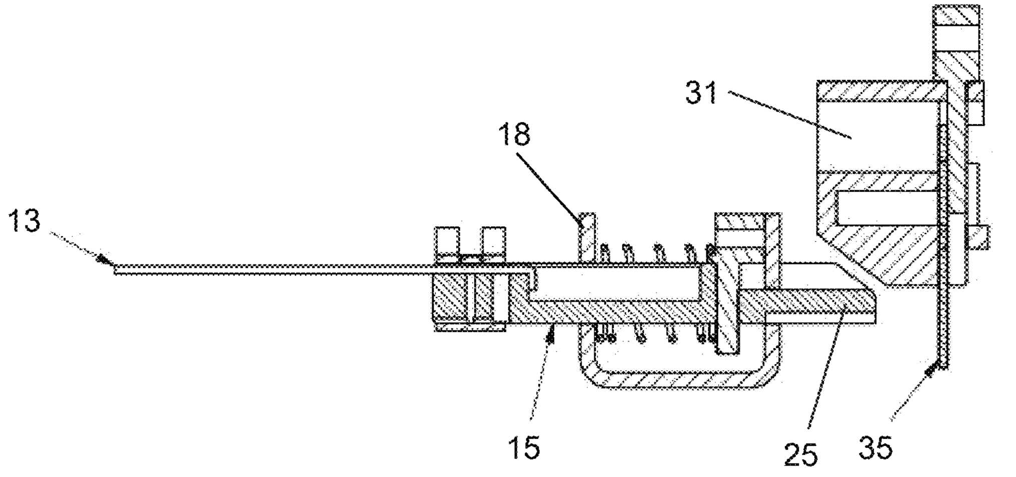
FIG. 4 illustrates a cross sectional side view of the latch mechanism from FIG. 1, with the pin in an extended position but not in a latched configuration with the keeper.

The pin 15 moves between an extended position as shown in FIGS. 2 and 4, and a retracted position as shown in FIG. 3. In the extended position, an end 25 of the pin 15 opposite to the connection with the rod 13 extends outwardly from the bracket 16. The movement towards the extended position is limited when the retaining pin 24 contacts an inner surface of the flange 18. The spring 22 acts between the retaining pin 24 and the other flange 18 to bias the pin 15 towards the extended position.

The pin 15 can be moved against the bias of the spring 22 to a retracted position, where the pin end 25 does not protrude as far from the bracket 16. Various means of moving the pin 15 against the bias of the spring 22 will be described below.

The latch mechanism 10 also includes a keeper 30 that has an aperture 31. The keeper 30 also has clips 32 and projections 33. The keeper 30 is mounted to a supporting structure 35, such as a housing of a drawer unit for example, by inserting the clips 32 and or projections 33 through holes in the supporting structure 35.

The clips 32 create a snap fit with the supporting structure, to initially provide a simple placement and basic hold of the keeper 30 in position. It was surprisingly found during development of the keeper, however, that the force from the pin during closing could actually pull the keeper out of the supporting structure. Accordingly, a stronger and more secure fit was developed by inserting a keeper retaining pin 36 through holes 37 in the projections 33 of the keeper 30.

Figure 5:
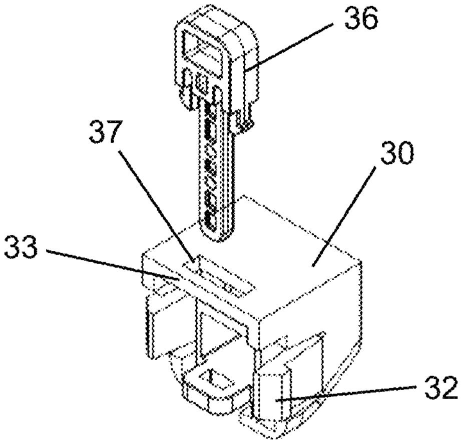
FIG. 5 illustrates an isometric view of the keeper with a retaining pin removed.
Figure 6:
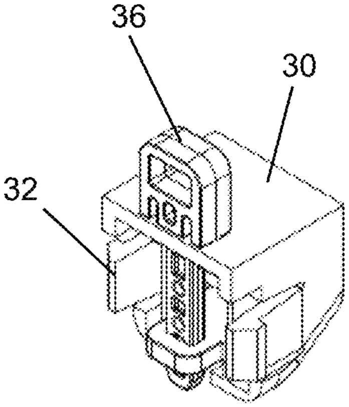
FIG. 6 illustrates an isometric view of the keeper with the retaining pin inserted.

FIGS. 5 and 6 show the setup of the keeper 30 and retaining pin 36 in more detail. While the keeper retaining pin 36 is not essential to the working of the invention, it is advantageous because it provides a very strong barrier to withdrawal of the projections 33 from the supporting structure 35, and therefore a very strong and secure mounting of the keeper 30 to the supporting structure 35.

Referring now to FIG. 2, the pin 15 is in an extended position and located within the aperture 31 of the keeper 30, thereby latching the bracket 16 to the keeper 30. That is, the bracket 16 is prevented from moving in a downward direction as shown in the Figure, due to the pin 15 contacting the inside of the keeper 30.

This latch can be released by moving the pin 15 against the bias of the spring 22, so that it is in the retracted position. The bracket 16 would then be able to move relative to the keeper 30. The pin 15 may be moved in this was by engaging the actuator 11 so that the rod 13 is placed in tension. A bend 40 at the end of the rod 13 engages a shoulder 41 of the pin 15, thereby pulling the pin 15 away from the extended position towards the retracted position.

Referring now to FIG. 4, the pin 15 is in the extended position but not in a latched configuration with the keeper 30. From this position, it is not necessary for the actuator 11 to withdraw the pin 15 in order for the pin 15 to be moved to the latched configuration with the keeper 30. Instead, the pin 15 has a bevel 44 and the keeper has a corresponding bevel 45. Movement of the bracket 16 in an upward direction from that shown in FIG. 4 causes the pin bevel 44 and the keeper bevel 45 to contact each other. This contact forces the pin 15 towards the retracted position, as shown in FIG. 3.

Figure 13:
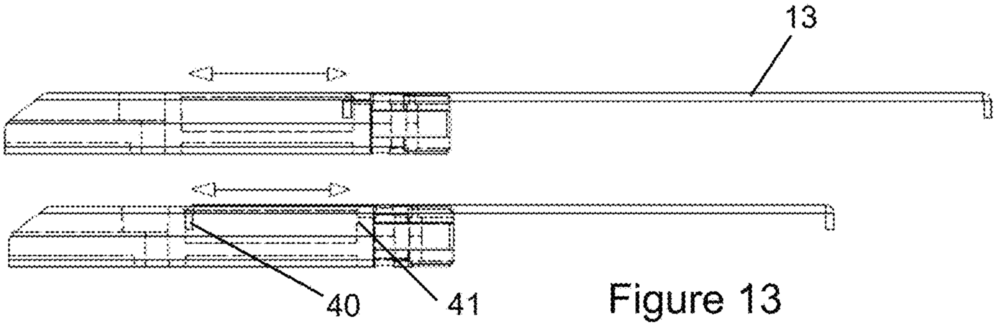
FIG. 13 illustrates two side views of the pin and rod.

Referring in more detail to FIG. 3, it can be seen that when the pin 15 is moved to the retracted position by the keeper 30 rather than the rod 13 and actuator 11, the rod 13 remains stationary. Instead, the bend 40 of the rod 13 separates from the shoulder 41 of the pin 15, with the pin having a channel extending away from the shoulder 41 to allow this movement to occur. This setup is also shown in more detail in FIG. 13.

The rod 13 is free to slide relative to the pin 15 along the longitudinal axis of the pin 15. This movement can occur because the rod 13 is located in a slot 47 of the pin 15 and a clamp 48 retains the rod 13 in the slot 47 without securing it in a fixed position. The rod 13 is rigid, ensuring it slides relative to the pin 15 rather than simply falling limp, as this could potentially result in unwanted interactions with nearby structures, such as catching and causing a malfunction, for example.

At the same time, however, despite the rod 13 being rigid, the movement of the pin 15 to the retracted position can occur without any effect on the actuator 11. This is advantageous, because it allows for a situation where the handle assembly 12 may be locked and the actuator 11 may otherwise prevent movement of the pin 15. Instead, the latch mechanism 10 can still be moved to the latched configuration, regardless of the setup of the actuator 11.

The latch mechanism 10 is designed so that, in one example embodiment, it can be fitted to a drawer unit. The drawer unit would typically have a drawer mounted in a housing, wherein the bracket 16 is secured to the drawer and the housing forms the supporting structure 35 to which the keeper 30 is mounted.

Advantageously, the same latch mechanism 10 may be fitted to drawers of a variety of sizes, simply by altering the length of the rod 13. This may be achieved by making rods 13 of various sizes available, or simply by cutting the rod to length and re-fitting to the handle assembly 12.

In some embodiments, a fine adjustment system may be included to overcome drawer and cabinet tolerances. One example of such an adjustment system may be a screw mechanism in the end of the slam pin 15. This screw mechanism would adjust the position of the shoulder 41 in a forward or reverse motion to ensure the rod 13 retracts the pin 15 the full travel of the handle motion of the handle assembly 12. In another version, the rod 13 is split into two pieces and a coupling engages the two rod sections. The coupling has two slots with barbs which grip the rod 13 at the desired point, allowing the rod 13 to be shortened or lengthened as required.

In use, the latch mechanism 10 can hold the drawer closed when the pin 15 is in a latched configuration with the keeper 30. Activation of the handle 19 of the handle assembly 12 can withdraw the pin 15, allowing the drawer to be opened. When closing the drawer, the pin bevel 44 contacts the keeper bevel 45 as described previously, causing the pin 15 to be moved towards the retracted position and allowing the drawer to be closed. The spring 22 then returns the pin 15 to the extended position in the keeper 30, securing the drawer closed once more.

Referring now to FIG. 8, an optional alternative means of releasing the pin 15 from within the keeper 30 is shown. In this example, the keeper 30 comprises one or more through holes that are an extension to the aperture 17, and the keeper retaining pin 36 comprises a through hole 49. By also providing the supporting structure with an appropriately located hole, the through holes of the retaining pin, the keeper and the supporting structure are aligned to allow access by a release device 50 to the pin 15 when located in the aperture 17.

Figure 12:
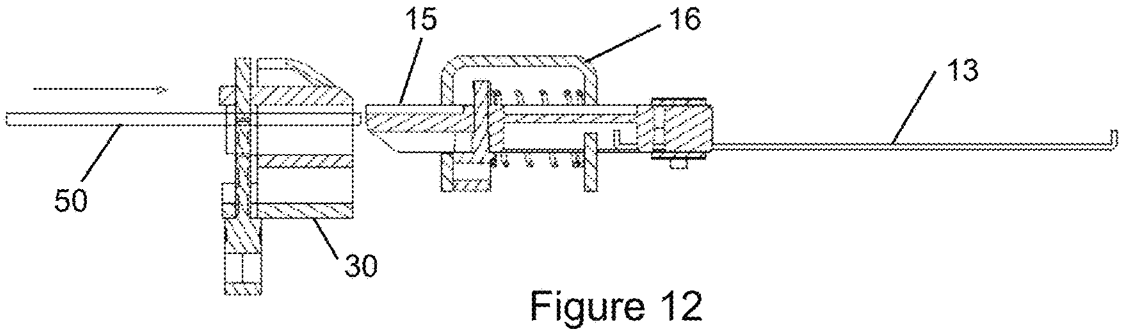
FIG. 12 illustrates a cross sectional side view of the latch mechanism taken along section C-C.

This setup can allow the pin 15 to be moved to the retracted position even if it becomes stuck as described previously. Depending on the design and construction of the handle assembly 12, there may be a risk of breaking a component by applying excessive force if the pin 15 is stuck. Instead, the release device 50 can be inserted as shown by the arrow to move the pin 15 from within the aperture 17. The use of the release device 50 is also shown in more detail in FIGS. 12 and 14, while FIGS. 9 and 10 show the setup of the access holes.

Figure 11:
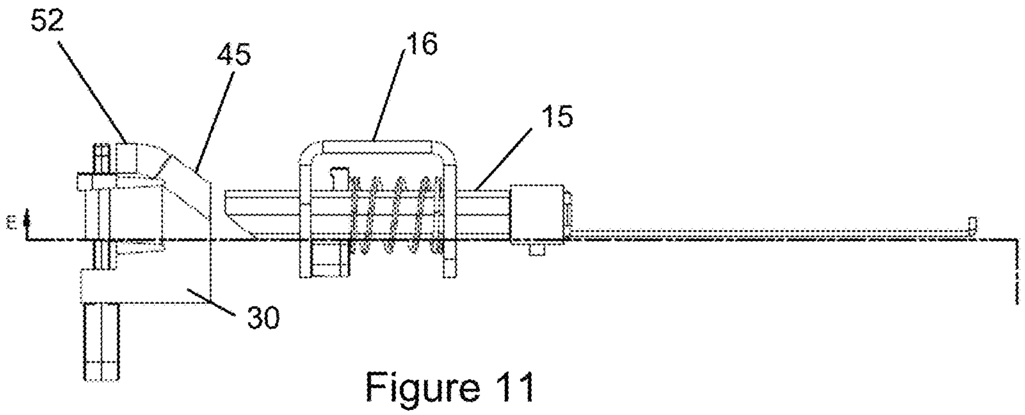
FIG. 11 illustrates a side view of the latch mechanism taken along section D-D showing the location of section E-E.

In some embodiments, the keeper 30 may optionally include a dampener. This may be attached to an outer portion 52 of the keeper 30 as shown in FIG. 11, or alternatively the outer portion 52 may be made from an appropriate material to function as the dampener. Such an appropriate material may be Thermoplastic Vulcanisates (TPV) or a synthetic rubber with a suitable Shore hardness value. Such a suitable value may be in the Shore A range typically from about 40 to 90, or more preferably from about 60 to 70.

The dampener is positioned so that the drawer (not shown) contacts the dampener when in a closed position and/or close to the closed position, but wherein the pin 15 does not contact the dampener during closing of the drawer. In this way, the dampener can absorb the impact of the drawer when closing and/or reduce movement or rattling of the drawer if used in a vehicle when the vehicle is in motion, for example.

It will be appreciated by those skilled in the art that the latch mechanism 10 may also be fitted to a range of other items, such as cupboards or cabinets, for example. It will also be appreciated that various changes may be made to the latch mechanism while still falling within the scope of the invention. For example, alternative means of biasing the pin may be provided other than a spring.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as “front” and “rear”, “inner” and “outer”, “above” and “below” and the like are used as words of convenience to provide reference points and are not to be construed as limiting terms.

Whilst the present invention has been described with reference to particular embodiments, it will be understood that many modifications will be apparent to those skilled in the art. All such variations and modifications should be considered to fall within the scope of the invention as broadly described and as claimed below.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps. As used herein and unless otherwise stated, the term "approximately" means ±20%.

LIST OF PARTS

10 latch mechanism 31 aperture
11 actuator 32 clip
12 handle assembly 33 projection
13 rod 35 supporting structure
14 clamp 36 keeper retaining pin
15 pin 37 hole
16 bracket 40 bend
17 aperture 41 shoulder
18 flange 44 pin bevel
19 handle 45 keeper bevel
20 key 46 channel
21 keyway 47 slot
22 spring 48 clamp
24 retaining pin 49 hole
25 pin end 50 release device
30 keeper 52 outer portion

What is claimed is:

1. A latch mechanism, comprising:

a) a keeper comprising an aperture and being configured to be mounted to a supporting structure in a fixed position; and b) a pin that is fitted to a bracket, the bracket fixed to a drawer that is moveable between an open and a closed position, the bracket fixedly positioned on the drawer so that when the drawer is in the closed position the bracket is adjacent to the keeper with the pin aligned to the keeper aperture, the pin slidably mounted for movement along a longitudinal axis of the pin relative to the bracket, the pin moveable between an extended position where the pin extends partially through the bracket and a retracted position where a distal end of the pin is positioned within the bracket, wherein the pin is biased towards the extended position such that the pin is located in the extended position at rest;

wherein the keeper and the pin have corresponding bevels; and wherein the pin is selectively engaged by an actuator so that the actuator manually moves the pin from the extended position to the retracted position, and the pin is mechanically moved from the extended position to the retracted position without effecting movement of the actuator when the bevel of the pin contacts the bevel of the keeper, the bias returning the pin to the extended position after retraction, and wherein the actuator is connected to a handle so that the actuator engages the pin when the handle is operated;

wherein the actuator includes a rod, the actuator retracting the pin by applying tension to the rod, wherein the rod is rigid;

wherein the rod is fitted to the pin in a manner that allows sliding movement of the rod relative to the pin along the longitudinal axis of the pin; and wherein the rod has a bend at an end that is fitted to the pin, the bend abutting a shoulder of the pin so as to limit the extent of the relative sliding movement of the rod.

2. The latch mechanism according to claim 1, wherein the pin comprises a channel extending away from the shoulder such that the bend of the rod is able to move away from the shoulder.

3. The latch mechanism according to claim 1, wherein the rod is located in a slot of the pin and a clamp extends around the pin to slidably retain by encircling the rod in the pin slot, wherein the rod moves longitudinally within the slot and with respect to the pin in response to movement of the actuator.

4. The latch mechanism according to claim 1, wherein a length of the rod is mechanically adjustable to allow the distance between the actuator and the pin to be altered.

5. The latch mechanism according to claim 1, wherein the bracket comprises two flanges that each comprise an aperture, the pin being fitted through the apertures in the flanges, as well as an aperture in a spring so that the spring engages the pin to cause the biasing force with respect to the flange biasing the pin to the extended position.

6. The latch mechanism according to claim 5, wherein at least one of the flange apertures comprises a key and the pin comprises a keyway, such that the key slides within the keyway while preventing rotation of the pin.

7. The latch mechanism according to claim 5, wherein a retaining pin is fitted to the pin at a location between the flanges, such that the retaining pin limits the travel of the pin and the spring abuts the retaining pin and one of the flanges of the bracket.

8. The latch mechanism according to claim 5, wherein at least one of the flange apertures comprise a sleeve insert.

9. The latch mechanism according to claim 1, wherein the keeper has a protrusion extending through the mounting structure, and a keeper retaining pin extends through an aperture in the protrusion thereby securing the keeper to the mounting structure.

10. The latch mechanism according to claim 9, wherein the keeper comprises one or more through holes and the keeper retaining pin comprises a through hole, the through holes of the retaining pin and the keeper being aligned to allow access by a release device to the pin when located in the aperture.

11. The latch mechanism according to claim 1, including a drawer unit, wherein the latch mechanism is constructed and arranged to secure the drawer of the drawer unit in a closed position.

12. The latch mechanism according to claim 11, wherein the drawer unit comprises a drawer mounted in a housing, wherein the pin bracket is secured to the drawer and the housing forms the supporting structure to which the keeper is mounted.

13. The latch mechanism according to claim 12, wherein a series of aligned holes allow access to the pin when located in the aperture from outside the drawer unit by a release device.

14. The latch mechanism according to claim 11, wherein the drawer unit is mounted in a vehicle, such as a van, truck, caravan, or boat.

* * * * *